United States Patent [19]
Kanazawa

[11] Patent Number: 5,561,530
[45] Date of Patent: Oct. 1, 1996

US005561530A

[54] MAGNETIC RECORDING DEVICE WITH AUTOMATIC MEDIA-TEST FUNCTION

[75] Inventor: Yoshikazu Kanazawa, Nagaokakyo, Japan

[73] Assignee: Mitsubishi Denki Kabushiki Kaisha, Tokyo, Japan

[21] Appl. No.: 280,812

[22] Filed: Jul. 26, 1994

[30] Foreign Application Priority Data

Aug. 19, 1993 [JP] Japan .................................. 5-205132
Jan. 28, 1994 [JP] Japan .................................. 6-008844

[51] Int. Cl.⁶ ............................................... H04N 5/76
[52] U.S. Cl. ............................ 386/46; 386/113; 360/27; 360/31
[58] Field of Search ............................ 358/335, 310, 358/342, 315, 320, 327, 337; 360/27, 31, 33.1; H04N 5/76

[56] References Cited

U.S. PATENT DOCUMENTS

| | | | |
|---|---|---|---|
| 4,262,313 | 4/1981 | Mouri | 360/31 |
| 5,060,091 | 10/1991 | Matsuzaki | 360/31 |
| 5,081,547 | 1/1992 | Howell | 360/31 |
| 5,087,992 | 2/1992 | Dahandeh et al. | 360/31 |
| 5,121,260 | 6/1992 | Asakawa et al. | 360/31 |
| 5,331,616 | 1/1994 | Morita et al. | 360/31 |
| 5,386,324 | 1/1995 | Fry et al. | 360/31 |
| 5,408,367 | 4/1995 | Emo | 360/31 |
| 5,424,880 | 6/1995 | Nakano et al. | 360/27 |
| 5,438,459 | 8/1995 | Suga et al. | 360/31 |
| 5,485,320 | 1/1996 | Vogel et al. | 360/31 |

FOREIGN PATENT DOCUMENTS

| | | |
|---|---|---|
| 63-150204 | 8/1985 | Japan . |
| 61-68704 | 4/1986 | Japan . |
| 373470 | 3/1991 | Japan . |

Primary Examiner—Thai Q. Tran

[57] ABSTRACT

A magnetic recording device records an input signal on a magnetic medium. Either when the magnetic medium is first inserted in the device, or just before recording of the input signal is to begin, the device determines whether a previously-recorded signal is present on the medium. If no previously-recorded signal is present, a test signal is recorded and reproduced, and the reproduced level of at least one test frequency is measured. Thereafter, during recording of the input signal, the input signal is processed according to the measured level so as to produce a record signal optimally matched to the characteristics of the medium.

38 Claims, 14 Drawing Sheets

TAPE A

TAPE B

MAGNETIC RECORDING DEVICE WITH AUTOMATIC MEDIA-TEST FUNCTION

BACKGROUND OF THE INVENTION

This invention relates to a method of magnetic recording using a magnetic recording medium, such as a magnetic tape, including a step of testing characteristics of the magnetic medium by recording a test signal, and Featured by a step of determining whether such a test signal can be recorded without erasing a previously recorded signal. The invention also relates to a magnetic recording and reproducing device, such as a video tape recorder, e.g., a video cassette recorder, that is used for implementing such a method.

Video tape cassettes of various grades used for video recording by a video cassette recorder are available. To ensure successful recording on all grades of tape, conventional video cassette recorders have often been designed to match the frequency characteristics of the lowest-grade tape. This is to prevent inverted white peaks with whatever type of tape is used and ensure a sufficient signal-to-noise ratio. Such video cassette recorders, however, fail to take full advantage of the superior characteristics of higher-grade tape.

This will be explained with reference to FIG. 15 and FIG. 16. FIG. 15 shows the frequency characteristics of two tapes, a high-grade tape A and a lower-grade tape B. The horizontal axis indicates frequency. The vertical axis indicates power received from the magnetic heads, before demodulation. Both tapes show a diminishing response at higher frequencies, but tape A provides a higher playback level at all frequencies, and particularly at high Frequencies. If the record circuit is adjusted to match the characteristics of the tape B, the frequency characteristics of the video signal reproduced from the tape A and tape B are as shown in FIG. 16.

Despite the fact that the tape A has superior frequency characteristics, the signal reproduced from the tape A shows characteristics inferior to those of the signal reproduced from the tape B if the signals are recorded under condition matched the tape B. It does not necessarily mean that tape B gives a better reproduced picture than tape A, because tape A has a higher signal-to-noise ratio. It is however obvious that the superior frequency characteristics of tape A shown in FIG. 15 are not being properly utilized.

One scheme that addresses this problem equips a video cassette recorder to record and reproduce a test signal, thereby sense tape characteristics, and adjust its own recording characteristics to take optimum advantage of the characteristics of the tape. For instance, prior to recording, a test signal is recorded and reproduced to assess or determine the frequency characteristics of the tape, and an equalizer or the like in the recording circuit is controlled in accordance with the result of the assessment.

The present invention is directed to certain problems that arise when this scheme is implemented. One problem is that signals that are already recorded on the tape may be undesirably erased when the test signal is recorded. Another problem is that circuits used for implementing the test is complex and expensive.

SUMMARY OF THE INVENTION

It is accordingly an object of the invention to enable recording under optimum conditions for the particular magnetic recording medium, such as magnetic tape, without the risk of erasing the signal already recorded on the magnetic recording medium.

Another object of the invention is to enable assessment of the characteristics, avoiding the positions on the recording area of magnetic recording medium where recorded signal is present.

Another object of the invention is to prevent the recording of the input signal from being carried out without first performing the assessment of the characteristics, and hence under conditions which are not optimum.

A further object of the invention is to avoid repetition of the assessments of the characteristics, to thereby achieve the recording of the input signals efficiently.

A further object of the invention is to enable use of the existing circuits and minimize addition of circuits to implement the determination as to whether a recorded signal is present.

According to the invention there is provided a method of recording a signal on a magnetic medium, comprising the steps of:

automatically determining whether a previously-recorded signal is present on said magnetic medium;

assessing characteristics of said magnetic medium by:
    recording a test signal on said magnetic medium, if no previously-recorded signal is present; and reproducing said test signal and measuring a reproduced level of at least one frequency component thereof;

receiving an input signal;

processing said input signal responsive to said reproduced level, thereby producing a record signal matched to the characteristics of said magnetic medium; and recording said record signal on said magnetic medium. According to the invention, there is provided a magnetic recording and reproducing apparatus for recording and reproducing a signal on a magnetic medium (64), comprising:

a test signal generator (4) for generating a test signal comprising at least one test frequency;

a record circuit (2) for producing a record signal by processing an input signal responsive to a control signal, or on the basis of said test signal;

a record/playback mechanism (6) coupled to said record circuit (2), for recording said record signal on said magnetic medium (64), and for picking up a signal recorded on said magnetic medium (64), thereby generating a playback signal;

a playback circuit (8) coupled to said record/playback mechanism (6), for processing said playback signal, thereby producing an output signal;

a test signal level detector (12) coupled to said playback circuit (8), for measuring a reproduced level of said test frequency, thereby assessing characteristics of said magnetic medium (64);

a record controller (14) coupled to said record circuit (2) and said test signal level detector (12), for determining optimal control conditions from the reproduced level of said test frequency and producing said control signal according to said optimal control conditions;

said record circuit (2) optimizing said record signal according to said characteristics of said magnetic medium (64) on the basis of said control signal;

signal detecting means (70; 92, 94; 96; 98) for determining whether a previously-recorded signal is present on said magnetic medium (64);

a system controller (10) for causing, if no previously recorded signal is present, said test signal generator (4), said record circuit (2) and said record/playback mechanism (6) to record said test signal, said record/playback mechanism (6) and said playback circuit (8) to reproduce said test signal, said test signal level detector (12) to measure the reproduced level of said test frequency, and said record controller (14) to determine said optimum control conditions therefrom.

According to the invention, the characteristics of the tape is assessed by recording and reproducing the test signal, after having confirmed that no recorded signal is present on the magnetic recording medium, so that the risk of undesirably erasing the recorded signal is eliminated, and yet it is possible to record the signal under conditions matched to the characteristics of the magnetic recording medium, and to realize the potential performance of the particular magnetic recording medium.

It may be so arranged that if said system controller (10) determines that a previously-recorded signal is present, it causes said record/playback mechanism (6) to move said magnetic medium (64) to a point where no previously-recorded signal is present.

With the above arrangement, if a previously-recorded signal is found present, the magnetic medium (64) is moved to a point where no previously-recorded signal is present, so that the assessment of the characteristics can be conducted without erasing the previously-recorded signal.

It may be so arranged that the assessment of the characteristics is conducted when said magnetic medium (64) is inserted in said record/playback mechanism (6).

With the above arrangement, whether a previously-recorded signal is present is determined when the magnetic medium (64) is inserted, so that it is possible to avoid the risk of recording the input signal under conditions which are not optimum due to the failure to conduct the assessment of the characteristics.

It may be so arranged that the assessment of the characteristics is conducted prior to recording of said input signal when it is commanded to record the input signal.

With the above arrangement, the assessment of the characteristics is conducted each time recording is commanded, prior to the recording, so that it is possible to avoid recording under conditions which are not optimum due to the failure to conduct the assessment of the characteristics.

The record/playback mechanism (6) may have a control head (68) that records and reproduces control pulses on said magnetic medium (64), and said system controller (10) may be adapted to determine whether a previously-recorded signal is present by detecting said control pulses.

With the above arrangement, whether a previously-recorded signal is present is determined by detecting the control pulses recorded on the magnetic recording medium. Since the detection of the control pulses is made also for other purposes, existing circuits for such a purpose can be utilized and addition of circuits can be minimized, and yet the presence or absence of the recorded signal can be determined.

It may be so arranged that the playback signal comprises an audio signal, said playback circuit (8) detects an envelope of said audio signal, and said system controller (10) determines from said envelope whether a previously-recorded signal is present.

With the above arrangement, whether a previously-recorded signal is present is determined by detecting the envelope of the audio signal recorded on the magnetic recording medium. The envelope detector forms part of a servo system conventionally used in VTRs for tracking the audio and video tracks. Accordingly, by using such an envelope detector, addition of circuits can be minimized and yet the presence or absence of the recorded signal can be determined.

It may be so arranged that said playback signal comprises a frequency-modulated video signal, said playback circuit (8) detects an envelope of said frequency-modulated video signal, and said system controller (10) determines From said envelope whether a previously-recorded signal is present.

With the above arrangement, whether a previously-recorded signal is present is determined by detecting the envelope of the frequency-modulated video signal. The envelope detector forms part of a servo system conventionally used in VTRs for tracking the video tracks. Accordingly, by using such an envelope detector, addition of circuits can be minimized and yet the presence or absence of the recorded signal can be determined.

It may be so arranged that said playback signal comprises a video signal with synchronization pulses, said playback circuit (8) separates said synchronization pulses from said video signal, and said system controller (10) determines from said synchronization pulses whether a previously-recorded signal is present.

With the above arrangement, whether a previously recorded signal is present is determined by separating and detecting synchronization pulses From the video signal. It is common to provide a sync separation circuit for preventing random noises appearing on the screen when no video signals are present. In such a case, utilizing the sync separation circuit, addition of circuits can be minimized and yet the presence or absence of the recorded signal can be determined.

It may be so arranged that said test signal has at least two test frequencies; and said test signal generator (4) comprises:

an oscillator (102) for generating a first signal having a first frequency;

a frequency doubler (104) for doubling said first frequency, thereby producing a second signal; and a multiplexer (106) for combining said first signal and said second signal to produce said test signal.

With the above arrangement, a frequency doubler for doubling the frequency of a first signal is used, so that signals of two frequencies can be obtained by addition of minimum circuits, and the assessment of the characteristics can be conducted accurately.

It may be so arranged that said test signal has at least two test frequencies; and said test signal generator (4) comprises:

an oscillator (102) for generating a first signal having a first frequency;

a frequency divider (108) for dividing said first frequency in half, thereby producing a second signal; and a multiplexer (106) for combining said first signal and said second signal to produce said test signal.

With the above arrangement, a frequency divider for dividing the frequency of a first signal is used, so that signals of two frequencies can be obtained by addition of minimum circuits, and the assessment of the characteristics can be conducted accurately.

The oscillator (102) may be a system controller clock oscillator. Then, the output of the system controller clock oscillator is used as the test signal, so that addition of circuits is minimized and yet the presence or absence of the recorded signal can be determined.

The oscillator (102) may be a color subcarrier oscillator. Then, the output of the color subcarrier oscillator is used as the test signal, so that addition of circuits is minimized and yet the presence or absence of the recorded signal can be determined.

It may be so arranged that said record circuit (2) comprises a frequency modulator (54), and said test signal generator (4) comprises a voltage source for producing at least one fixed voltage, said frequency modulator (54) receiving said fixed voltage in substitution for said input signal.

With the above arrangement, the output of the frequency modulator obtained when a fixed voltage is applied, so that the circuits for frequency-modulating the video or audio signals can be utilized, and addition of circuits can be minimized and yet the presence or absence of the recorded signal can be determined.

DETAILED DESCRIPTION OF THE INVENTION

Embodiments of the invention will be described with reference to the attached illustrative drawings. These drawings do not restrict the scope of the invention, which should be determined from the appended claims. Detailed descriptions of well-known circuits and procedures will be omitted to avoid obscuring the invention with unnecessary detail.

Embodiment 1

Figure 1:
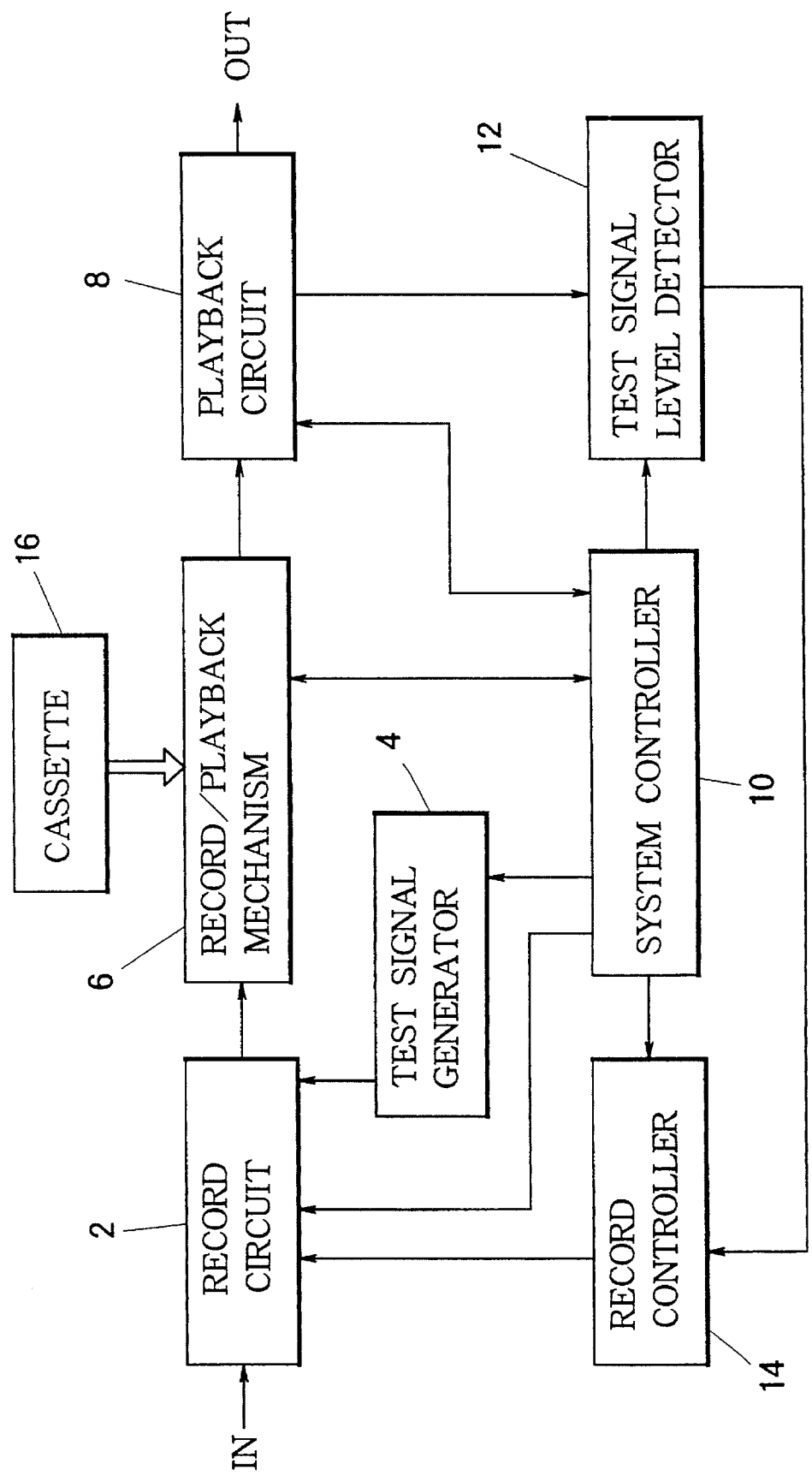
FIG. 1 is a block diagram showing a video cassette recorder of Embodiment 1 of the present invention.

FIG. 1 is a general block diagram of a video cassette recorder employing the present invention, comprising a record circuit 2, a test signal generator 4, a record/playback mechanism 6, a playback circuit 8, a system controller 10, a test signal level detector 12, and a record controller 14, interconnected as shown.

The record circuit 2 receives an input signal having both audio and video components, and performs various processes necessary to convert this signal to a record signal suitable for recording on magnetic tape. These processes typically include preemphasis, frequency modulation, and equalization, and may include further processes such as detail enhancement. At least one of these processes is controlled by the record controller 14.

The test signal generator 4 generates and supplies to the record circuit 2 a test signal, which can be substituted For the input signal at an intermediate stage of the processing carried out in the record circuit 2. The result of this substitution is that the record signal produced by the record circuit 2 comprises one or more test frequencies with fixed amplitudes, instead of being derived from the input signal.

The record/playback mechanism 6 includes stationary and rotary magnetic heads, a tape transport mechanism, and associated motors and circuits. This mechanism 4 records the record signal received from the record circuit 2 on a magnetic tape contained in a removable cassette 16, and can also pick up signals recorded on the magnetic tape. The record/playback mechanism 6 may also record and reproduce a control signal comprising timing pulses for synchronization of tape and head movement in playback mode.

The playback circuit 8 receives the signal picked up by the record/playback mechanism 6 in playback mode, and performs various processes necessary to convert it to audio and video output signals. These processes typically include equalization, frequency demodulation, and deemphasis, and may include such further processes as audio and video envelope detection and sync separation.

The system controller 10 may be formed of a microcontroller including a microcomputer, and controls the other components by, for example, selecting record or playback mode, and controlling the familiar tape transport functions of forward, fast-forward, and rewind. The system controller 10 also performs controls responding to commands received from a control panel or a remote control device (not shown in the drawing), and controls display of information on the control panel or on a television screen (also not shown in the drawing). The system controller 10 is furthermore adapted to determine whether or not a recorded signal is present on the tape. In this embodiment, this determination is made from the control signal reproduced by the record/playback mechanism 6.

The test signal level detector 12 receives from the playback circuit 8 a reproduced signal at an intermediate stage of processing, preferably after equalization but before demodulation, and detects in the reproduced signal the test frequencies recorded when the test signal generated by the test signal generator 4 was substituted for the input signal in the record circuit 2. The output of the test signal level detector 12 represents the reproduced level at each of these frequencies.

The record controller 14 receives and processes the output of the test signal level detector 12 to determine the optimal control conditions for controlling the record circuit 2. Later, when an input signal is being recorded, the record controller 14 generates a control signal, according to these optimal control conditions, that controls, for example, the equalization process or detail-enhancement process in the record circuit 2. The control scheme is adapted so that what the record controller 14 does is, in effect, to simulate the frequency characteristics of the magnetic tape on the basis of information received from the test signal level detector 12, and optimize the operation of the record circuit 2 according to the simulated characteristics. Further details will be given later.

Next, the effect of controlling the record equalizer 56 according to the frequency characteristics of the tape will be described with reference to FIG. 15 to FIG. 18.

Figure 15:
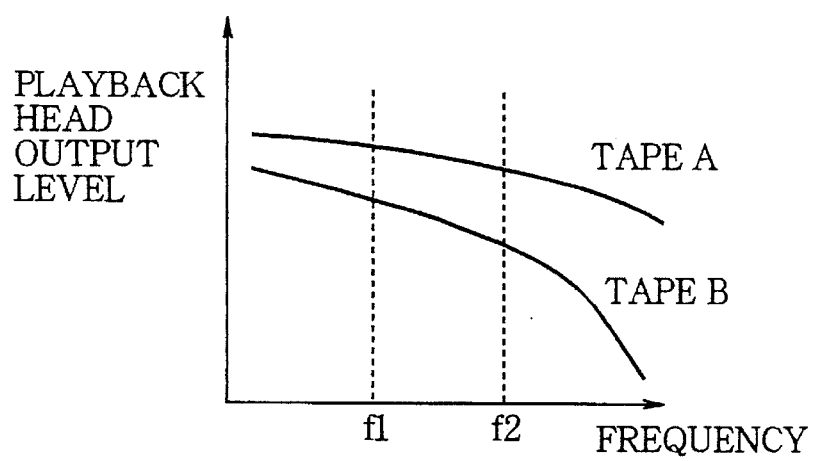
FIG. 15 Is a graph illustrating frequency characteristics of two tapes A and B.
Figure 17:
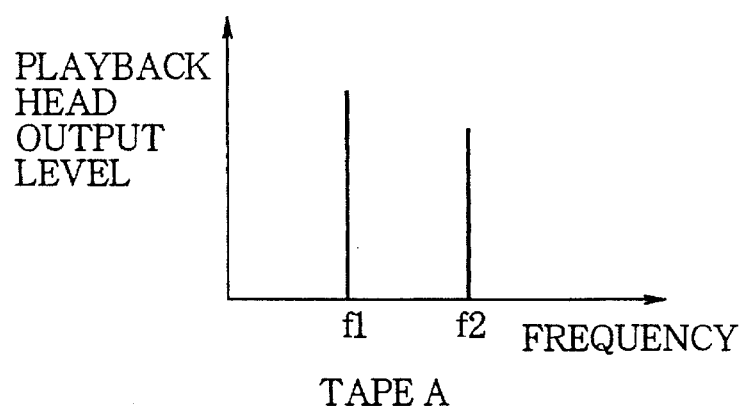
FIG. 17 is a graph of the frequency spectrum of a test signal recorded on tape A.
Figure 18:
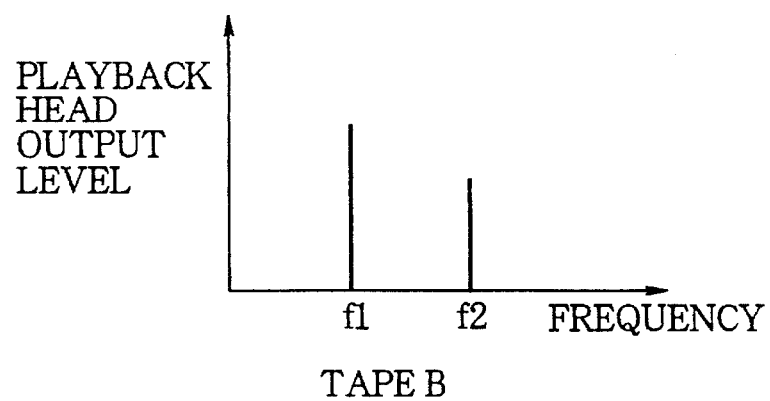
FIG. 18 is a graph of the frequency spectrum of a test signal recorded on tape B.

In FIG. 15, in the invented video cassette recorder, the frequency characteristics of each tape are measured at two points f1 and f2. FIG. 17 shows the result of this measurement for tape A. The horizontal and vertical axes have the same meaning as in FIG. 15. The two solid vertical lines represent the frequency spectrum of the reproduced test signal. Data corresponding to the height of these two lines are stored in the memory 88. FIG. 18 shows the similar result for tape B. From the level at frequencies f1 and f2 in FIG. 17 and FIG. 18, the record controller 86 is able to infer the general shape of the characteristic curves of tape A and tape B, and can control the record equalizer 56 accordingly.

Figure 16:
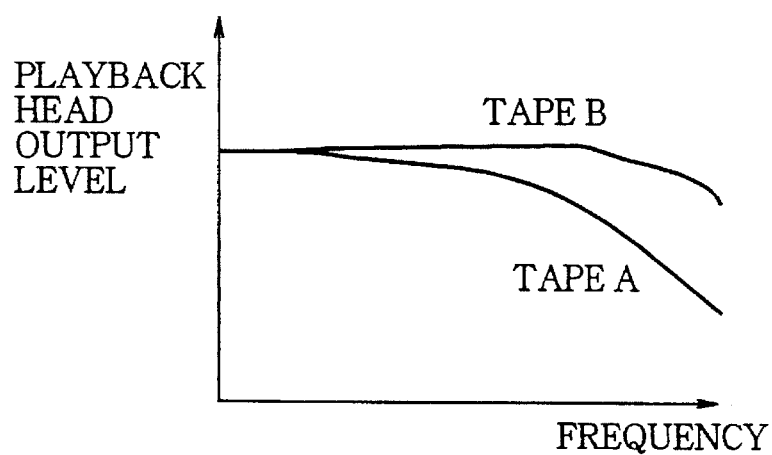
FIG. 16 is a graph illustrating frequency characteristics of video signals reproduced from tapes A and B, if recorded under conditions matched to tape B.

FIG. 16 shows the frequency characteristics of video signals reproduced From tapes A and B if the record equalizer 56 is matched to the characteristics of tape B. These are the frequency characteristics after equalization, FM demodulation, and de-emphasis by the playback equalizer 74, FM demodulator 76, and deemphasis circuit 78. Although tape A has a better frequency response, when both signals are recorded under conditions matched to tape B, the signal reproduced from tape A shows frequency characteristics inferior to those of the signal reproduced from tape B.

If the signal is recorded on tape A with equalization according to the frequency spectrum shown in FIG. 17, the situation in FIG. 16 can be avoided, and the potential performance of tape A more fully realized. Similar effects can be obtained by controlling detail enhancement as in FIG. 7.

In the present embroilments, the video cassette recorder tests the magnetic tape and records an input signal, after determining that no recorded signal is present on the tape. The procedure will next be described with reference to FIG. 2.

In the first step 20, the user presses a control button labeled, for example, "Record." In the next step 22 the system controller 10 moves the magnetlc tape slightly forward and backward, and determines whether a recorded signal is present at that point on the tape. If a recorded signal is present, in the next step 24 the system controller 10 notifies the user by, for example, an on-screen display, then halts operations.

If no recorded signal is present, in the next step 26 the system controller 10 proceeds to test the tape by recording the test signal generated by the test signal generator 4, then reproducing the test signal. The test signal level detector 12 detects the level of the test frequencies and reports the results to the record controller 14, which stores them.

The test signal can be recorded on a single track while the magnetic tape is stationary and only the rotary heads are moving, or it can be recorded while the magnetic tape is moving. If the test signal is recorded while the magnetic tape is moving, the tape must be rewound to its original point after the test signal is recorded, then preferably rewound again after the test signal is reproduced, so that the test signal will be erased when the input signal is recorded. If the test signal is recorded with the magnetic tape stationary, rewinding is unnecessary.

In the last step 28, the input signal is recorded on the magnetic tape. The record controller 14 now controls the record circuit 2 according to the test results obtained from the test signal level detector 12 in the test step 26, so that recording is adjusted to match the characteristics of the magnetic tape.

Figure 2:
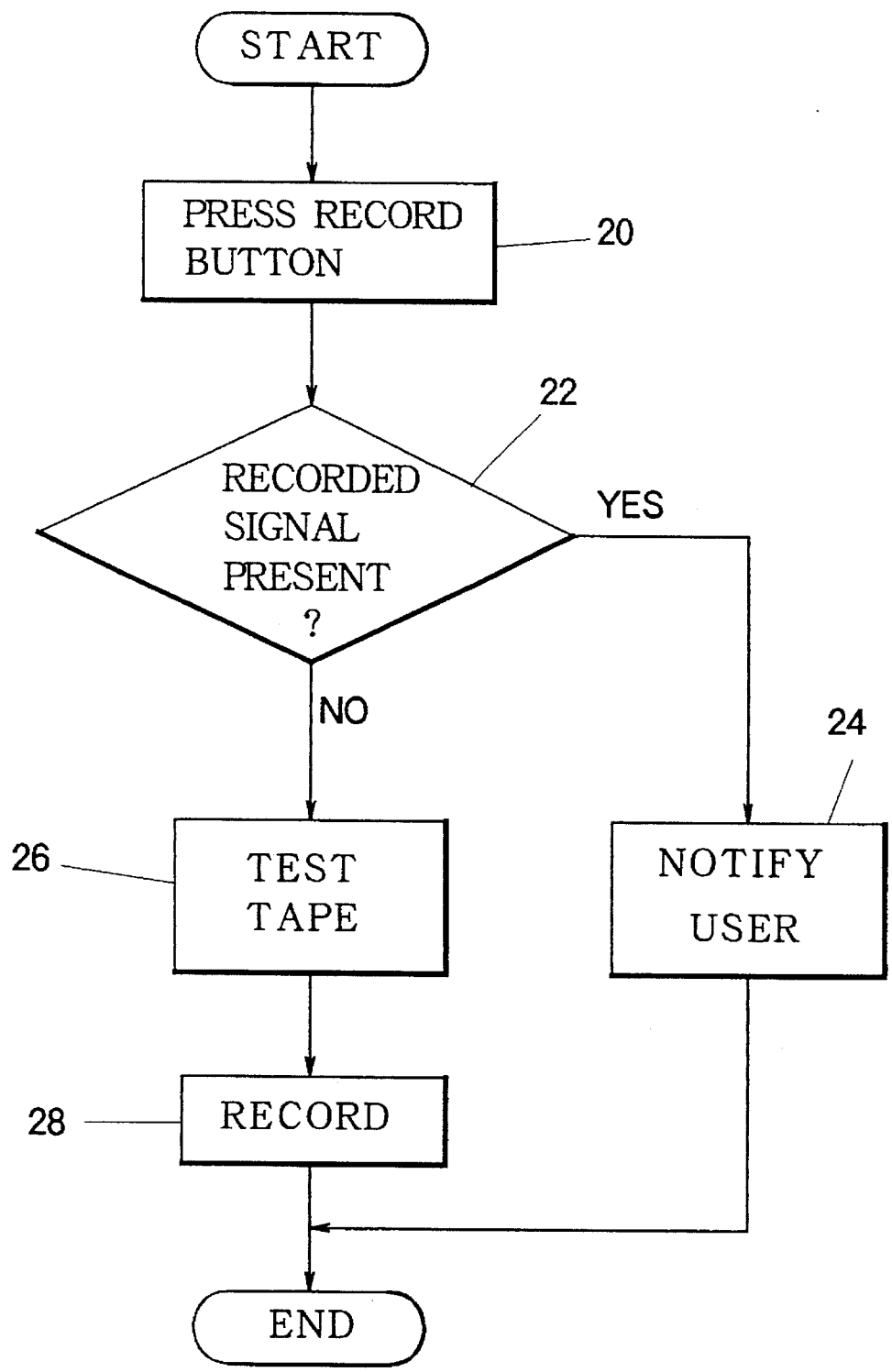
FIG. 2 is a flowchart illustrating the operation of Embodiment 1.

The mode of operation illustrated in FIG. 2 enables the magnetic tape to be tested and recording to be performed under optimal conditions without requiring any special operations by the user, who need not even be aware of the test. Accordingly, there is no risk that the user will forget to perform the test. Moreover, there is no risk that recording of the test signal will damage an existing recording. As a further benefit, if the user attempts to record over an existing recording, a warning is given.

As a modification to the configuration described above, another button labeled, For example, "Simulate" button may be provided in addition to the "Record" button, and it is so arranged that the test of the characteristics is carried out only when the "Simulate" button is pressed, while pressing "Record" button will start recording of the input signal without testing the characteristics of the tape. In such a configuration, it may be so arranged that the recording of the input signal is automatically started after the test. It may alternatively be so arranged that the recording is started only when the "Record" button is pressed separately From the "Simulate" button.

Embodiment 2

The apparatus used in this embodiment is identical to that shown in FIG. 1. A distinctive feature of this embodiment is that the video cassette recorder automatically advances the magnetic tape to a point where no recorded signal is present, then tests the tape in preparation for later recording. This embodiment will next be described with reference to FIG. 3.

In the first step 30, the user presses a button labeled, for example "Blank Search." In the next step 32 the system controller 10 determines whether a recorded signal is present at the current point on the tape, as it did in step 22 in FIG. 2.

If a recorded signal is present, in the next step 34 the system controller 10 decides whether the tape is at the end-of-tape position, and halts operations if it is. If the tape is not at the end-of-tape position, in the next step 36 the system controller 10 determines whether a recorded signal is present, while advancing the tape in fast-forward mode (steps 36 and 32). When the end-of-tape position is reached during the fast-forward transport (step 34), the operation is halted. During the fast-forward transport, the operations of the steps 32, 34 and 36 are carried out concurrently and repeatedly. When a first blank position where no recorded signal is present is found, the tape is tested (step 38) by recording and reproducing a test signal, and the results of the tape test are stored. In step 39, the user presses the Record button. In step 40 an input signal is recorded under optimal conditions as determined from the test results obtained in step 38.

If no recorded signal was found to be present at the current tape location when the Blank Search button was pressed, then the system controller 10 proceeds directly from step 32 to step 38 without advancing the tape.

Figure 3:
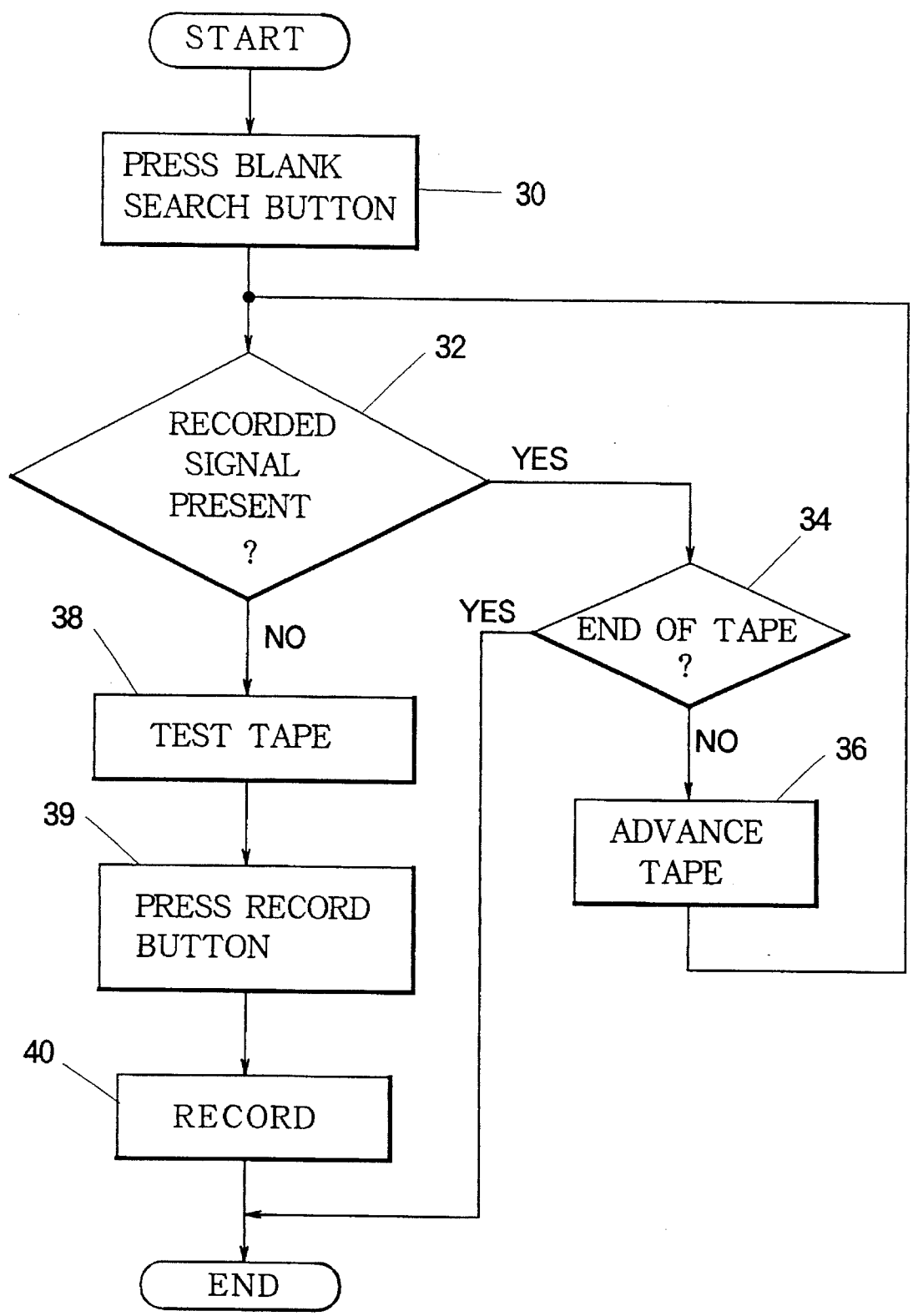
FIG. 3 is a flowchart illustrating the operation of Embodiment 2.

The mode of operation in FIG. 3 combines the automatic test feature of FIG. 2 with the blank search feature found in some conventional video cassette recorders. An advantage of the mode illustrated in FIG. 3 is that there is no delay between the pressing of the Record button in step 39 and the start of recording in step 40, because the tape test has already been completed in step 38.

Embodiment 3

Figure 4:
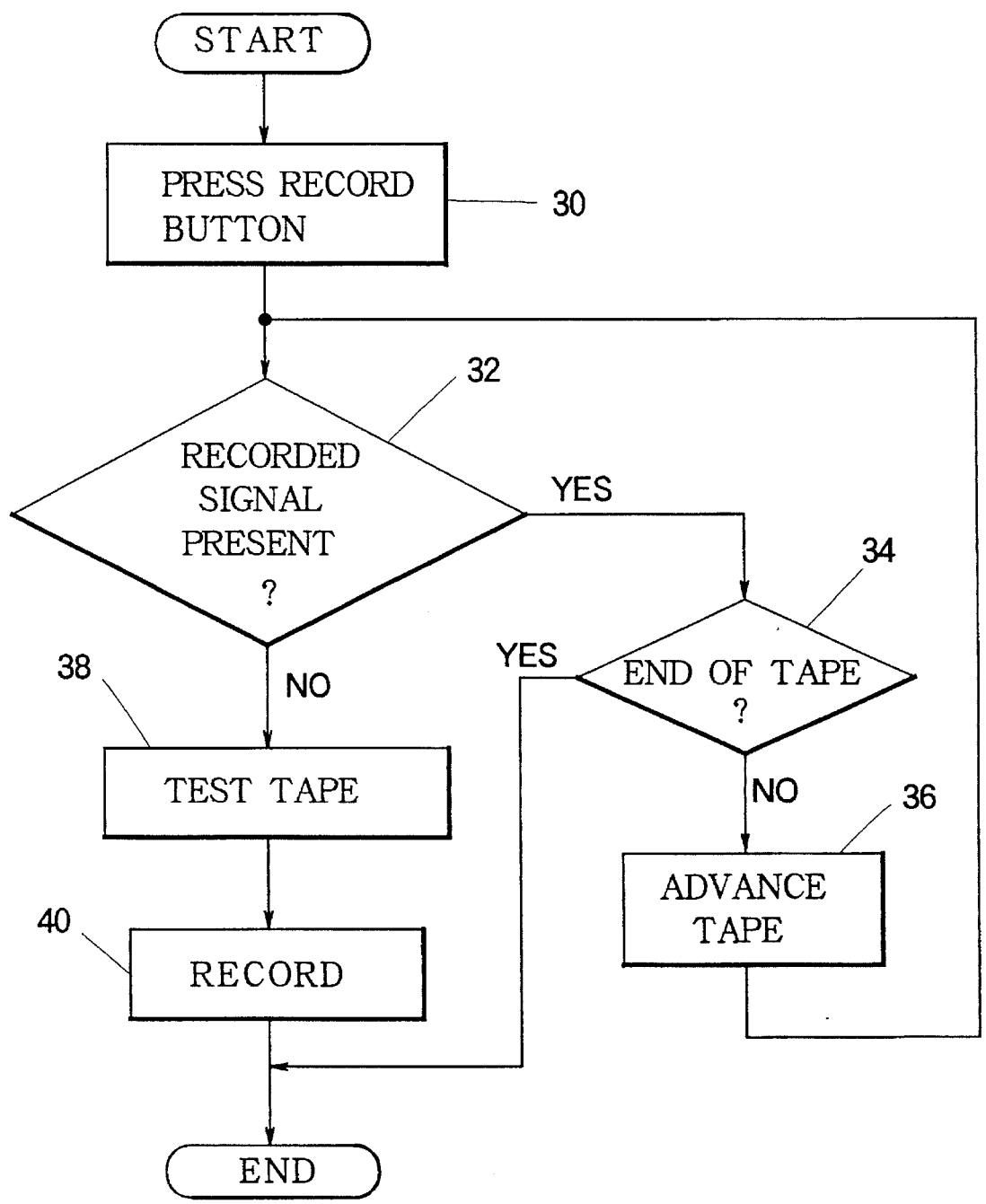
FIG. 4 is a flowchart illustrating the operation of Embodiment 3.

In Embodiment 2, when Blank Search button is pressed, the blank search and test are carried out, and when Record button is pressed recording of the input signal is started. As an alternative, it may be so arranged that when Record button is pressed, the blank search and test are performed, and the input signal is subsequently recorded automatically, as is shown in FIG. 4, in which the step 30 of "PRESS BLANK SEARCH BUTTON" in FIG. 3 has been replaced by a step 31 of "PRESS RECORD BUTTON", and the step 39 in FIG. 3 has been eliminated.

An advantage of this embodiment is that pressing a single button leads to all of the search for a blank position, the test of the tape and the recording of the input signal.

Embodiment 4

Figure 5:
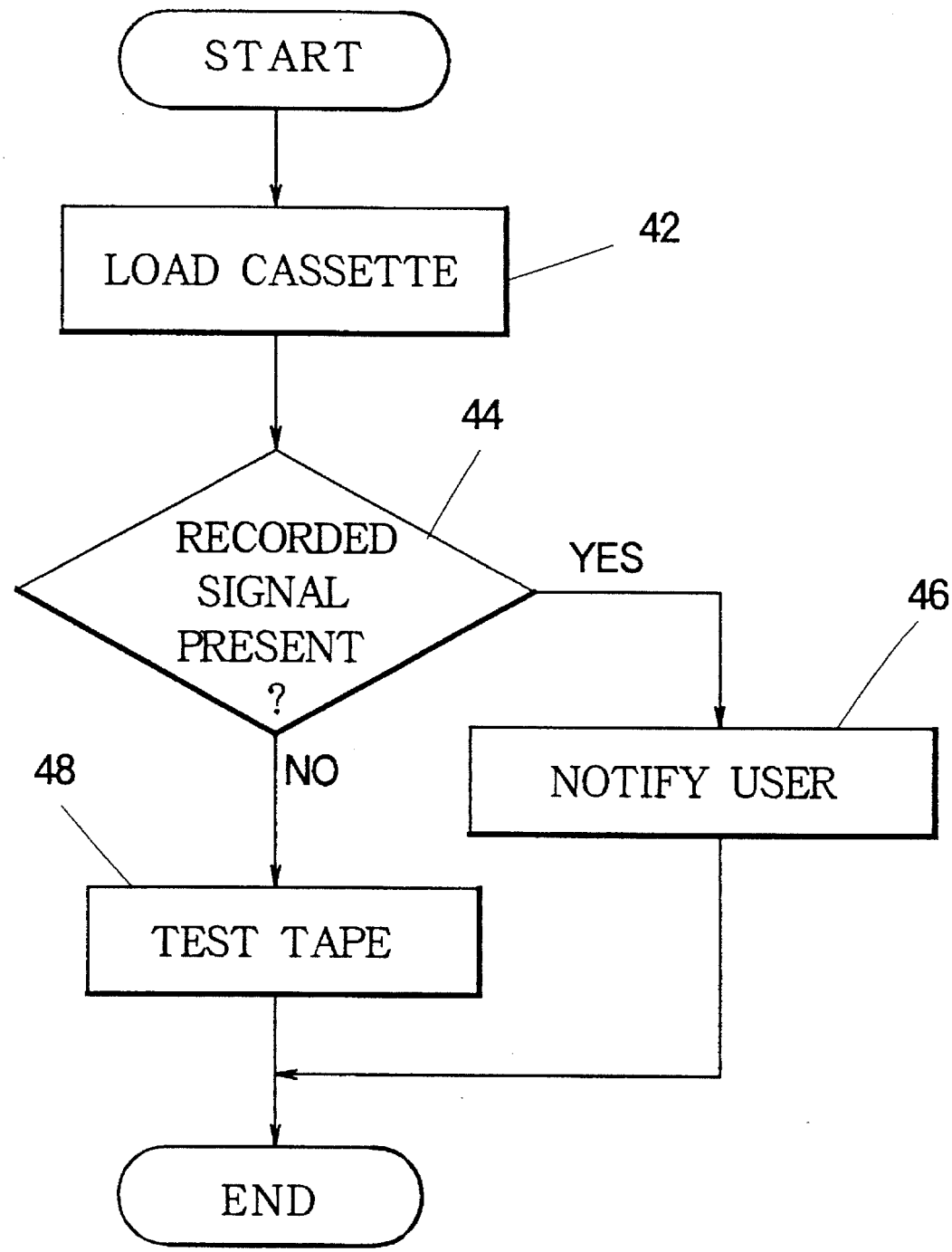
FIG. 5 is a flowchart illustrating the operation of Embodiment 4.

The present embodiment is similar to Embodiment 1 to Embodiment 3, but when a new magnetic tape cassette 16 is inserted in the video cassette recorder the test is carried out automatically after determining whether a recorded signal is present. This embodiment will next be described with reference to FIG. 5.

In the first step 42, the user inserts a cassette 16 into the video cassette recorder. In the next step 44, the system controller 10 determines the presence of a recorded signal. If a recorded signal is present, in the next step 46 the user is notified and the procedure ends. If no recorded signal is present, in the next step 48 the system controller 10 proceeds to test the tape as in step 26 in FIG. 2. The record controller 14 stores the results of the test in the record controller 14 for use in later recording. As long as the same cassette 16 remains in the video cassette recorder, recording will be controlled according to these test results, and no further tape tests will be performed.

By performing the tape test when a cassette is first inserted, the need for later test operations is eliminated. As in FIG. 8, recording of an input signal can start as soon as the Record button is pressed.

Embodiment 5

Figure 6:
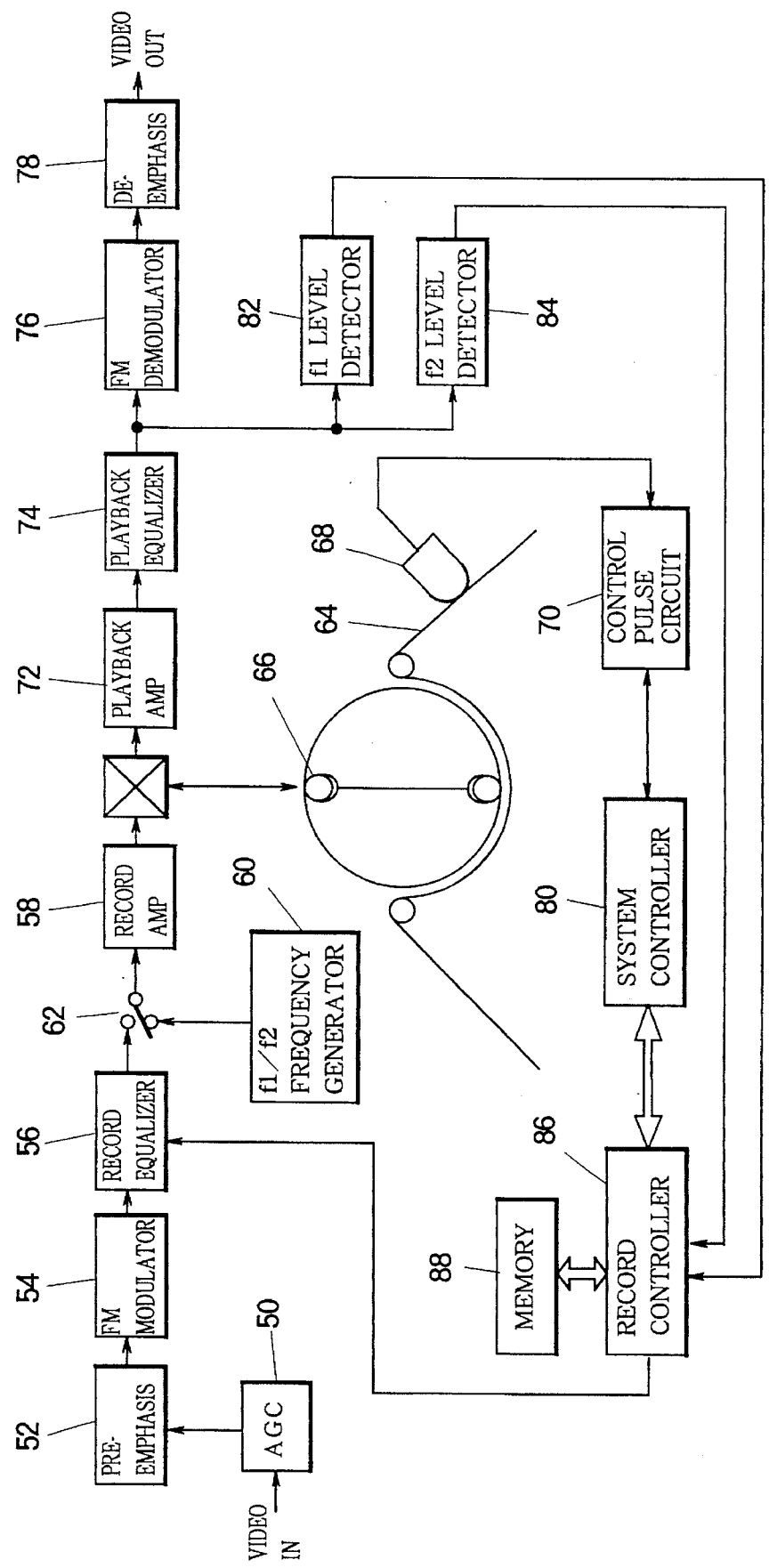
FIG. 6 is a block diagram showing a video cassette recorder of Embodiment 5.

FIG. 6 is a block diagram showing an example of circuitry of the device shown in FIG. 1. The record circuit 2 in FIG. 1 comprises an automatic gain control circuit 50, a preemphasis circuit 52, an FM modulator 54, a record equalizer 56, and a record amplifier 58. These are video signal-processing circuits; the audio circuits have been omitted to simplify the drawing.

The test signal generator 4 in this embodiment is an f1/f2 frequency generator 60 that outputs a test signal having two fixed frequencies f1 and f2. Frequency f1 is output in a first interval, followed by frequency f2 in a second interval. Examples of the structure of the frequency generator 60 will be shown later.

A switch 62 selects either this test signal or the output of the record equalizer 56 for input to the record amplifier 58.

In the record/playback mechanism 6, the magnetic tape 64 is transported around a drum with a pair of rotary video heads 66 that record and pick up signals on helical video tracks on the magnetic tape 64. A stationary control head 68 records and picks up control pulses on a linear control track on the magnetic tape 64. The control pulses are generated and reproduced by a control pulse circuit 70.

The playback circuit comprises a playback amplifier 72, a playback equalizer 74, an FM demodulator 76, and a deemphasis circuit 78. These are video signal-processing circuits; again, the audio circuits have been omitted to simplify the drawing.

The system controller 10 is, for example, formed of a microcontroller including a microcomputer 80 programmed to execute one of the operations illustrated in FIG. 2 to FIG. 5, as well as other system-control operations. The test signal level detector 12 comprises an f1 level detector 82 that detects the amplitude of the f1 component of the reproduced test signal, and an f2 level detector 84 that detects the amplitude of the f2 component. The level detectors 82 and 84 produce voltage signals representing the results of the detection.

The record controller 14 is, for example, formed of a microcontroller 86 programmed with rules for controlling the record equalizer 56 according to the levels reported by the f1 level detector 82 and f2 level detector 84. This record controller 86 has an internal analog-to-digital converter for converting the voltage signals from the level detectors 82 and 84 to digital data, and a memory 88 for storing these data, or values calculated therefrom.

The system controller 80 in FIG. 6 determines the presence of a recorded signal on the magnetic tape 64 by detecting the presence or absence of control pulses in the signal reproduced by the control pulse circuit 70. Implementation of this scheme requires minimal additional programming of the system controller 80, because the control pulses are already detected for servo control of tape transport and head rotation.

Embodiment 6

Figure 7:
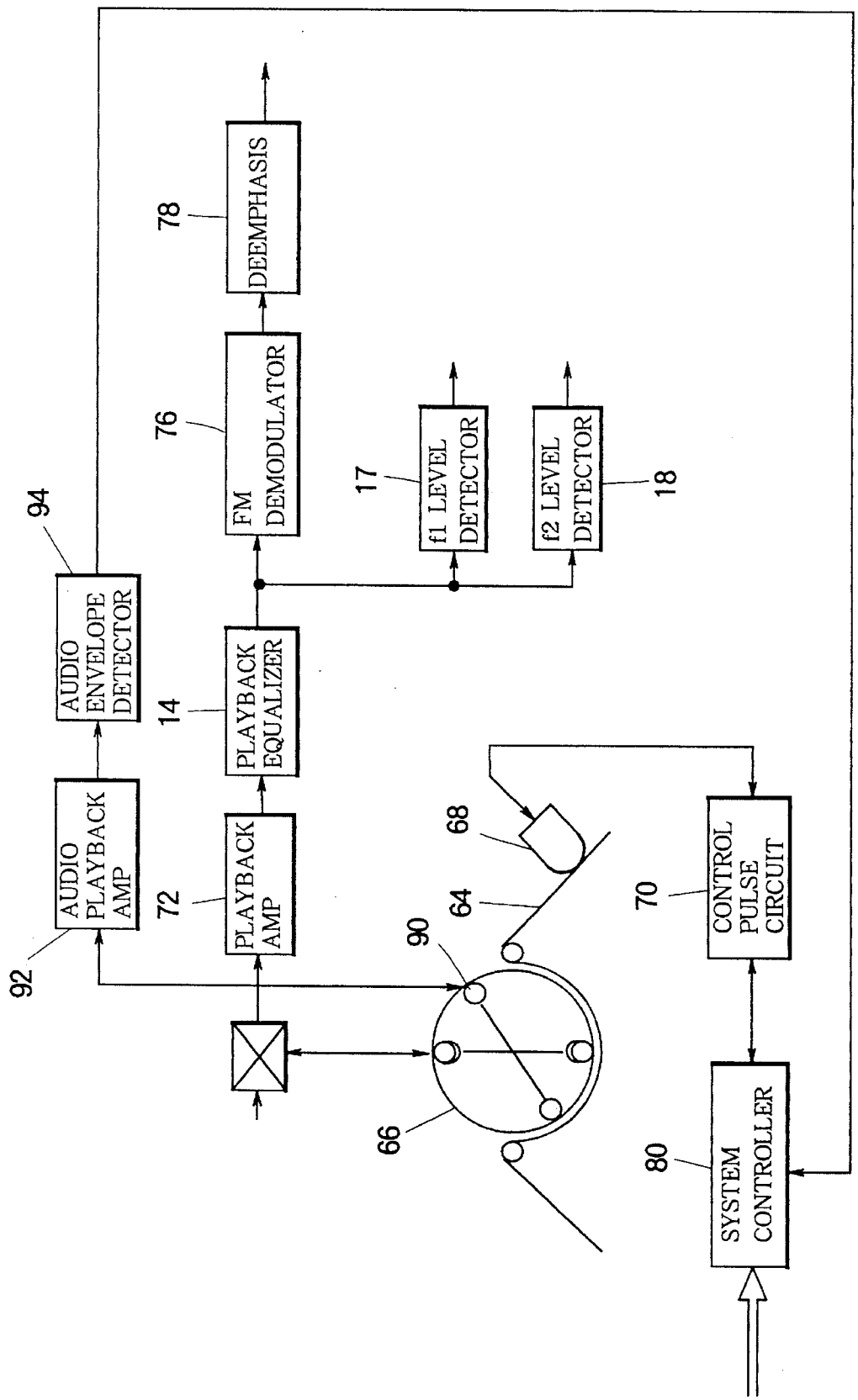
FIG. 7 is a block diagram showing a video cassette recorder of Embodiment 6.

In Embodiment 5, whether a recorded signal is present is determined by detecting the control pulses. As an alternative, such determination can be made by detecting the envelope of the audio signal. FIG. 7 shows part of a circuit of such an embodiment.

FIG. 7 shows the same elements as FIG. 6, with the same reference numerals, and the following additional elements: a pair of rotary audio heads 90 for recording and picking up an audio signal on an audio track on the magnetic tape 64; an audio playback amplifier 92 for amplifying the audio signal picked up by the audio heads 90; and an audio envelope detector 94 for detecting the envelope of the amplified audio signal.

The audio signal picked up by the audio heads 90 is, for example, a frequency-modulated signal or pulse-code modulated signal, the envelope of which depends mainly on whether an audio signal has been recorded or not and is substantially independent of the content of the recorded signal. The audio envelope detector 94 accordingly outputs a voltage signal which has a comparatively high value if an audio signal has been recorded, and a comparatively low value if no audio signal has been recorded. From this signal the system controller 80 can easily determine the presence or absence of recorded audio, and since audio and video signals are normally recorded together, this will also indicate the presence or absence of a recorded video signal.

The envelope detector 94 is part of the servo system used by conventional video cassette recorders to enable the audio heads 66 to follow the audio tracks recorded on the tape. Use of these envelope detectors enables the invention to be practiced with a minimum of additional circuitry.

Embodiment 7

Figure 8:
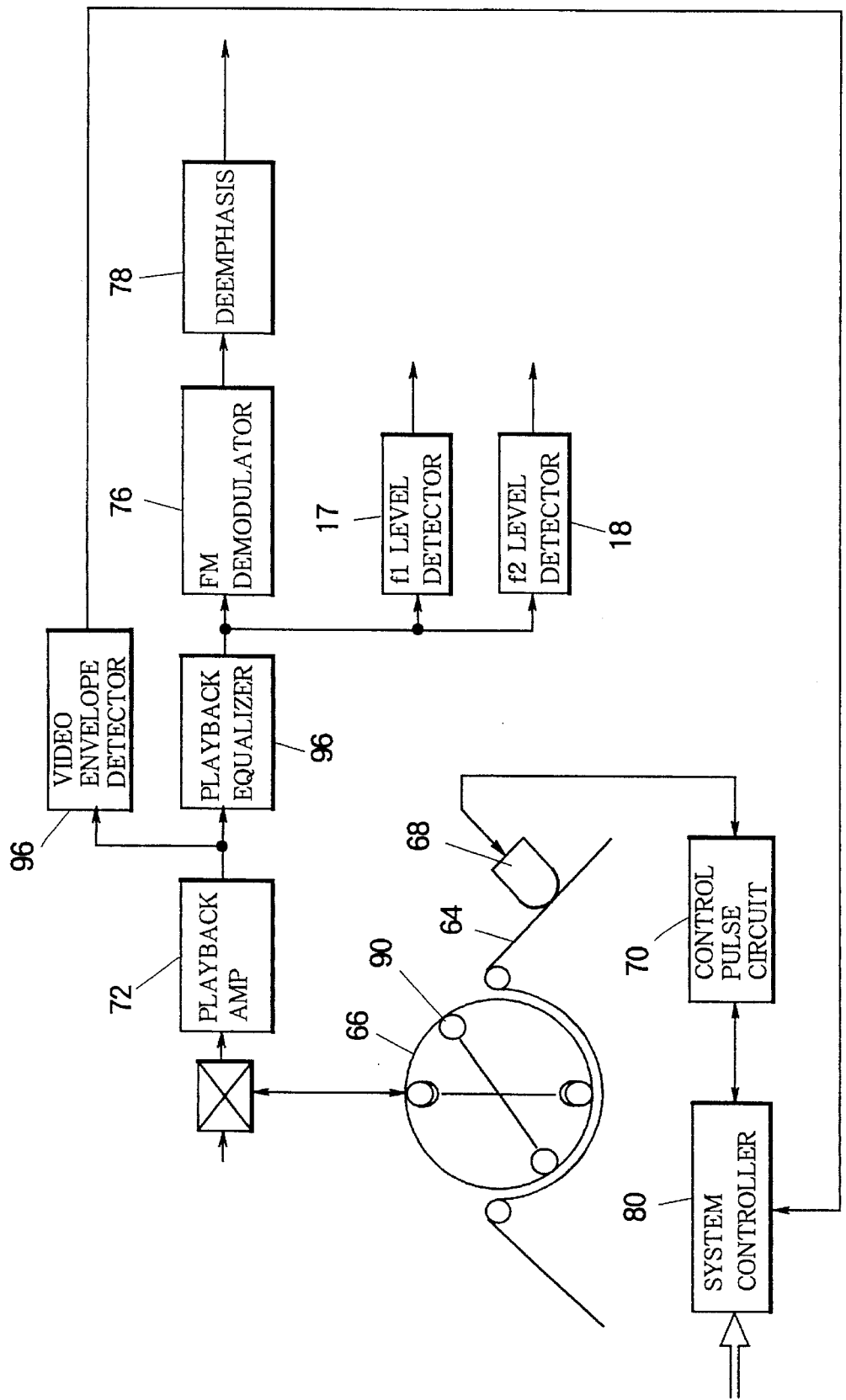
FIG. 8 is a block diagram showing a video cassette recorder of Embodiment 7.

Whether a recorded signal is present can be determined by detecting the envelope of the video signal. FIG. 8 shows part of a circuit of such an embodiment.

FIG. 8 shows the same elements as FIG. 6, with the same reference numerals, and additionally a video envelope detector 96 for detecting the envelope of the amplified video signal received from the playback amplifier 72.

The video envelope detector 96 outputs a voltage signal which has a comparatively high value if a recorded video signal is present, and a comparatively low value if no recorded video signal is present. The system controller 80 decides from the level of this voltage signal whether or not a video signal has already been recorded on the magnetic tape 64. Unlike the preceding methods using the audio signal or control pulses, this method detects the video signal directly.

The envelope detector 96 is part of the servo system used by conventional video cassette recorders to enable the video heads 66 to follow the video tracks recorded on the tape. Use of these envelope detectors enables the invention to be practiced with a minimum of additional circuitry.

Embodiment 8

Figure 9:
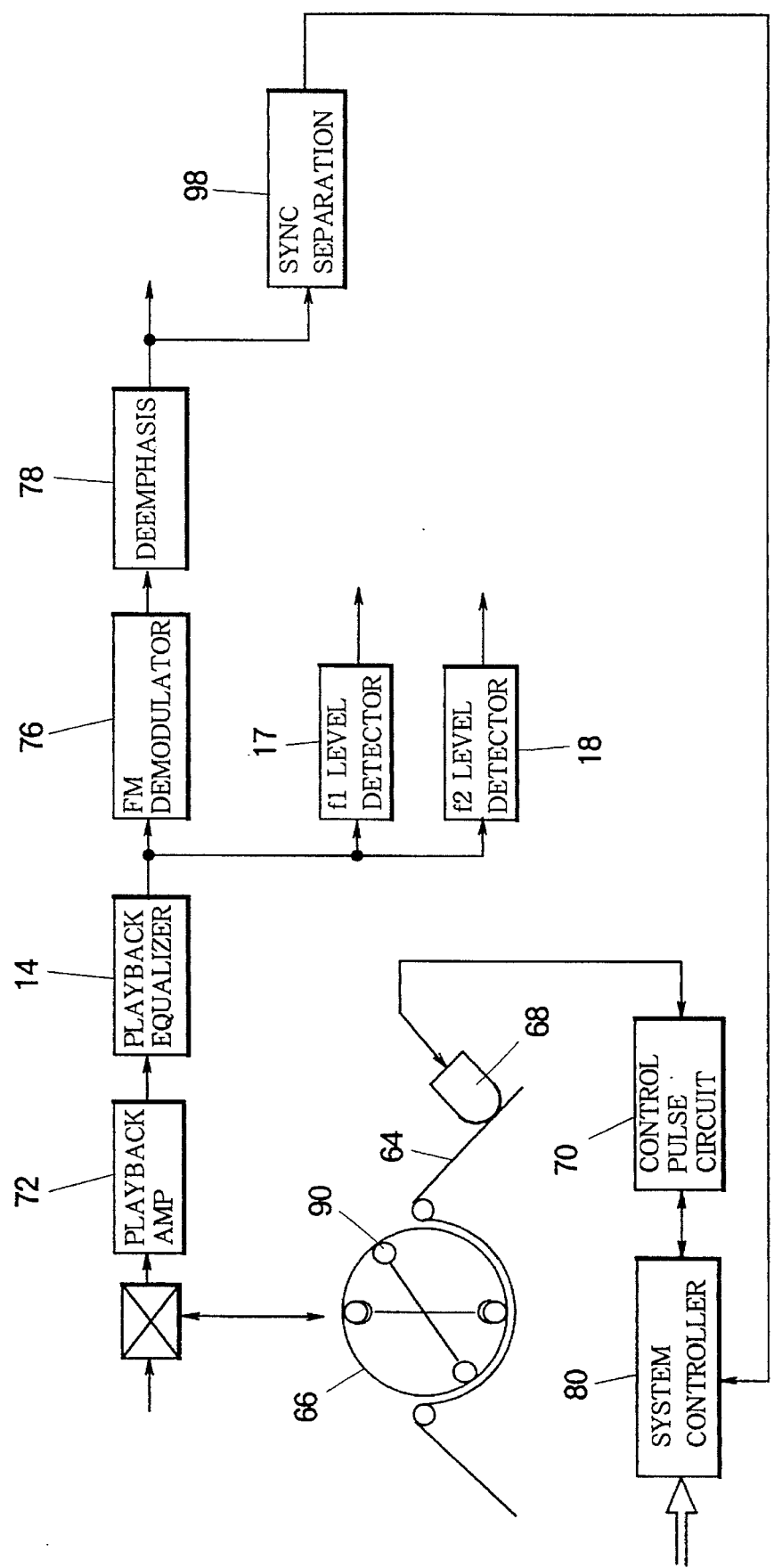
FIG. 9 is a block diagram showing a video cassette recorder of Embodiment 8.

Whether a recorded signal is present can be determined by detecting the sync pulses. FIG. 9 shows part of a circuit of such an embodiment.

FIG. 9 shows the same elements as FIG. 6, with the same reference numerals, and additionally a sync separation circuit 98 for separating synchronization signals from the video signal output from the deemphasis circuit 78.

The sync separation circuit 98 separates synchronization pulses that are used to control horizontal and vertical scanning in a cathode-ray tube or other video display device (not indicated in the drawing). The system controller 80 can determine the presence or absence of a recorded video signal from the presence or absence of these synchronization pulses.

Many video cassette recorders have a sync separation circuit 98 which they use to detect the presence or absence of video signal. This enables the video cassette recorder to blank the screen when no video signal is present, avoiding a display of random video noise. Use of this sync separation circuit 98 also enables the invention to be practiced with minimum additional circuitry.

Embodiment 9

Figure 10:
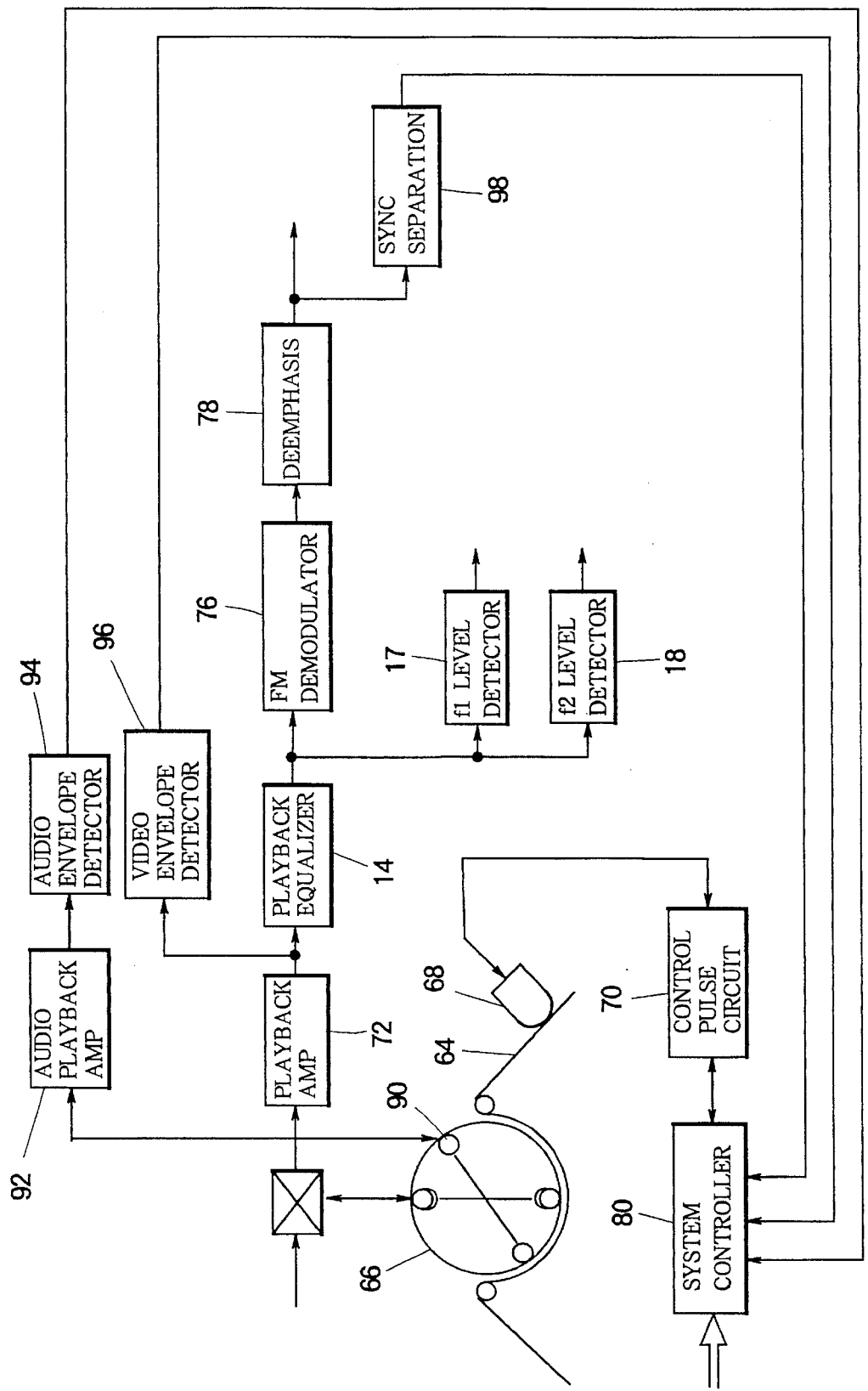
FIG. 10 is a block diagram showing a video cassette recorder of Embodiment 9.

In Embodiments 5, 6, 7 and 8, the control pulses, the envelope of the audio signal, the envelope of the video signal and the synchronization signals are respectively detected, and the presence or absence of the recorded video signal is determined on the basis of the result of the detection. However, it is also possible to detect two or more of the control pulses, the envelope of the audio signal, the envelope of the video signal and the synchronization signals, and the presence or absence of the recorded video signal can be determined on the basis of combination of the results of the detection. FIG. 10 shows part of a circuit for detecting all of the above, and the presence or absence of the recorded video signal can be determined on the basis of combination of all the results of detection.

Embodiment 10

Figure 11:
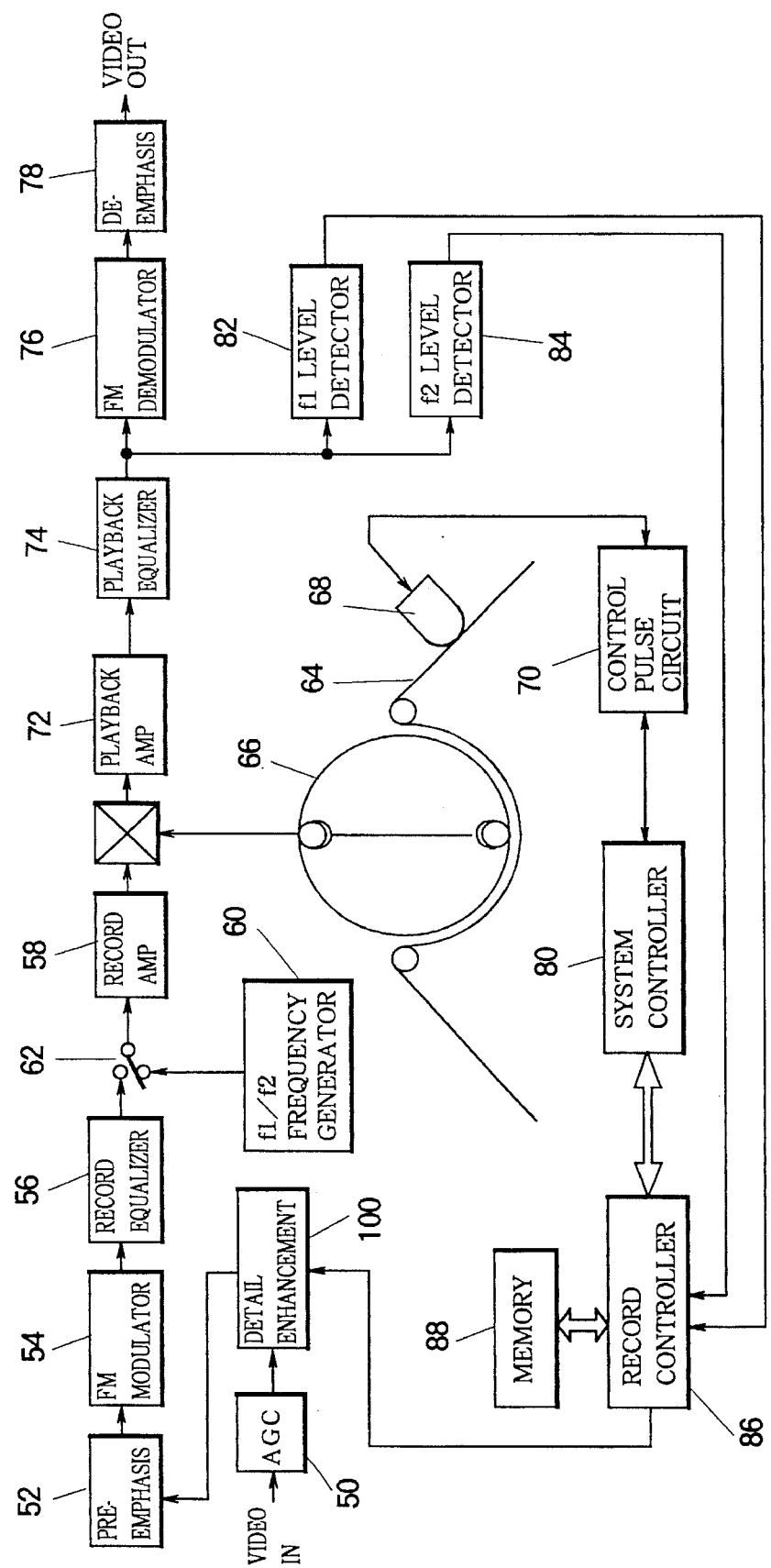
FIG. 11 is a block diagram showing a video cassette recorder of Embodiment 10.

FIG. 11 illustrates another embodiment of the invention, differing from FIG. 6 in the method of control of the recording characteristics. This drawing shows the same elements as FIG. 6, with the same reference numerals, and an additional detail-enhancement circuit 100 which is inserted between the automatic gain control circuit 50 and preemphasis circuit 52. The record controller 86 controls this detail-enhancement circuit 100 instead of controlling the record equalizer 56. Higher grades of magnetic tape, which have higher signal-to-noise ratios and a good high-frequency response, can support higher degrees of detail enhancement than can lower grades or tape. The record controller 86 accordingly controls the degree of detail enhancement according to the tape characteristics as determined from the test signal levels reported by the f1 level detector 82 and f2 level detector 84.

By controlling the degree of detail enhancement according to the tape characteristics determined, the potential performance of tape can be fully realized regardless of the type of the tape being used, in the same way as described with reference to Embodiment 1.

Embodiment 11

This embodiment relates to a circuit for generating the test signal. The description will be made with reference to FIG. 12.

Figure 12:
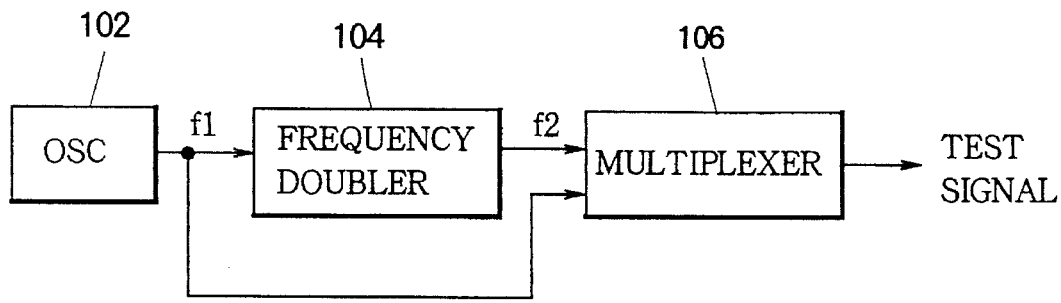
FIG. 12 is a block diagram showing a test signal generator of Embodiment 11.

In FIG. 12, the test signal is generated by an oscillator 102, a frequency doubler 104, and a multiplexer 106. The oscillator 102 is, for example the oscillator that generates the system clock signal input to the system controller 80. This clock signal has a frequency of, for example, 4 MHz, which is used as frequency f1. The frequency doubler 104 doubles this frequency and outputs a signal with a frequency of, for example, 8 MHz, which is used as f2. The multiplexer 106 selects first the f1 input from the oscillator 102, then the f2 input from the frequency doubler 104, to generate the test signal.

Embodiment 12

In Embodiment 11, the oscillator 102 is the system clock oscillator. It can alternatively be, for example, the color subcarrier oscillator, which generates a frequency f1 of 3.58 MHz. In this case f2 will be 7.16 MHz.

Embodiment 13

This embodiment is another example for generating the test signal. The description will be made with reference to FIG. 13.

Figure 13:
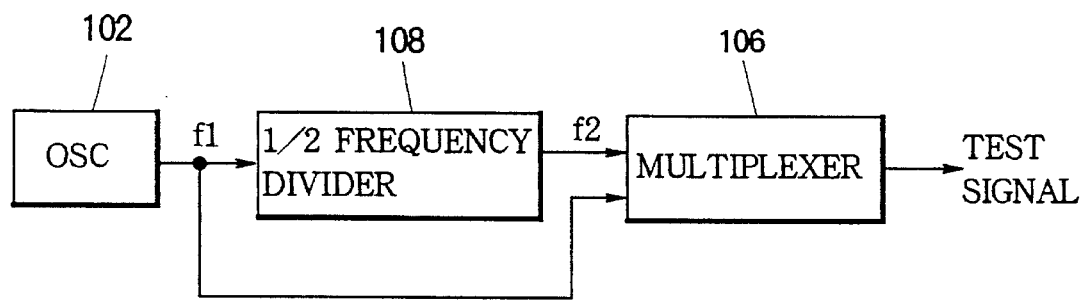
FIG. 13 is a block diagram showing a test signal generator of Embodiment 13.

FIG. 13 shows an arrangement similar to FIG. 12 except that the circuit coupled between the oscillator 102 and multiplexer 106 is a ½ frequency divider 108. If the oscillator 102 is a 4-MHz system clock oscillator, then f1 will be 4 MHz and f2 will be 2 MHz.

Embodiment 14

In Embodiment 13, the oscillator 102 is a system clock oscillator. It may alternatively be a color subcarrier oscillator. Then, f1 will be 3.58 MHz and f2 will be 1.79 MHz.

Embodiment 15

Since the configurations illustrated in FIG. 12 and FIG. 13 make use of an existing oscillator in the video cassette recorder, they can be practiced without significant added cost. However, in many video cassette recorders an even more economical method is available.

Figure 14:
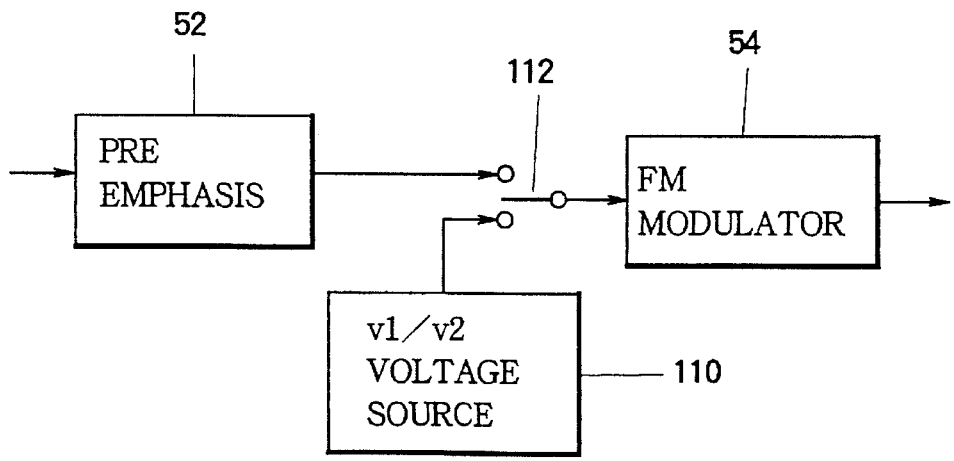
FIG. 14 is a block diagram showing a test signal generator of Embodiment 15.

Embodiment 15 relates to an example of a circuit for generating the test signal more economically, which is shown in FIG. 14.

As illustrated, the test signal generator of this example comprises a voltage source 110 that generates, in sequence, two fixed voltages $v_1$ and $v_2$. These voltages are input via a switch 112 to the FM modulator 54 in FIG. 6 or FIG. 11. The switch 112 replaces the switch 62, and selects either the output of the preemphasis circuit 52 or the output of the voltage source 110. When the output of the voltage source 110 is selected, the FM modulator 54 converts voltage $v_1$ to a fixed frequency f1, and voltage $v_2$ to a fixed frequency f2.

A video cassette recorder that records a frequency-signal generally has a variable resistor for control of the carrier frequency. With a slight circuit modification, this variable resistor can be used to produce the fixed voltages $v_1$ and $v_2$, providing a particularly simple and inexpensive way to generate the test signal.

Modifications

The operations of the video cassette recorder are not limited to those described with reference to Embodiments 1 to 4. For instance, it may be so arranged that the test can be executed upon the user's (operator's) choice even when the recorded signal is found to be present at the step 22, 32 or 44 in FIG. 2 to FIG. 5. In such a case, it may additionally be so arranged that the recorded video signal is reproduced and the resultant picture displayed on the monitor to facilitate the decision on whether the test should be executed (and hence the video signal may be erased).

When a particular cassette has been tested, the test at the step 26 in FIG. 2 or the step 38 in FIG. 3 or FIG. 4 may be omitted. In other words, once each cassette has been tested, the result of the test can be stored, and the control over recording can be made on the basis of the stored result of the test. With such an arrangement, repetition of the test can be avoided.

In determining the presence or absence of the recorded signal at the step 22 or 32, it may be so judged that the recorded signal is still absent, if the recorded signal has been found absent with respect Lo a certain tape and the tape has not been rewound after such finding. By making such a judgement, the actual test based on the detection of the control pulses, the envelope of the audio signal, the envelope of the video signal, the synchronization signals, or the like can be omitted.

The test signal described above has two frequency components f1 and f2, which are recorded sequentially, but this is not a restriction. The two frequencies can be recorded simultaneously, the f1 and f2 level detectors being provided with filters for permitting passage of the respective frequency components.

The invention can also be practiced with more than two test frequencies, to obtain more accurate information about the frequency response of the magnetic tape. Alternatively, it can be practiced with a test signal having only one frequency.

Applications of the invention are not restricted to video cassette recorders. The inventive concept can be usefully applied in other types of magnetic recording and reproducing apparatus as well.

Those skilled in the art will recognize that various modifications can be made to the apparatus described above without departing from the scope of the invention as set forth in the following claims.

What is claimed is:

1. A method of recording a signal on a magnetic medium, comprising the steps of:
   automatically determining whether a previously-recorded signal is present on said magnetic medium;
   assessing characteristics of said magnetic medium by:
   recording a test signal on said magnetic medium,
   if no previously-recorded signal is present; and
   reproducing said test signal and measuring a reproduced level of at least one frequency component thereof;
   receiving an input signal;
   processing said input signal responsive to said reproduced level, thereby producing a record signal matched to the characteristics of said magnetic medium; and
   recording said record signal on said magnetic medium.

2. The method of claim 1, comprising the further step of advancing said magnetic medium to a place where no previously-recorded signal is present, if a previously-recorded signal is found in the step of automatically determining whether or not a previously-recorded signal is present.

3. The method of claim 1, wherein the steps of assessing the characteristics is carried out automatically whenever a new magnetic medium is inserted.

4. The method of claim 1 wherein said magnetic medium is a magnetic tape.

5. The method of claim 4, wherein said magnetic medium is a video cassette tape.

6. The method of claim 1, wherein the step of determining whether a previously-recorded signal is present comprises the steps of:
   reproducing a signal from a control track on said magnetic medium; and
   determining whether control pulses are present in the signal thus reproduced.

7. The method of claim 1, wherein the step of determining whether a previously-recorded signal is present comprises the steps of:
   reproducing a signal from an audio track on said magnetic medium;
   detecting an envelope of the signal thus reproduced; and
   determining, from said envelope, whether an audio signal is present.

8. The method of claim 1, wherein the step of determining whether a previously-recorded signal is present comprises the steps of:
   reproducing a signal from a video track on said magnetic medium;
   detecting an envelope of the signal thus reproduced; and
   determining, from said envelope signal, whether a video signal is present.

9. The method of claim 1, wherein the step of determining whether a previously-recorded signal is present comprises the steps of:
   reproducing a signal from a video track on said magnetic medium; and
   determining whether synchronization pulses are present in the signal thus reproduced.

10. The method of claim 1, wherein said test signal comprises at least two signals with different frequencies.

11. The method of claim 10, wherein said test signal comprises:
    a controller clock signal having a certain frequency; and
    a signal with twice the frequency of said controller clock signal.

12. The method of claim 10, wherein said test signal comprises:
    a controller clock signal having a certain frequency; and
    a signal with half the frequency of said controller clock signal.

13. The method of claim 10, wherein said test signal comprises:
    a color subcarrier signal having a certain frequency; and
    a signal with twice the frequency of said color subcarrier signal.

14. The method of claim 10, wherein said test signal comprises:
    a color subcarrier signal having a certain frequency; and
    signal with half the frequency of said color subcarrier signal.

15. The method of claim 1, wherein the step of processing said input signal comprises a frequency-modulation step carried out by a frequency modulator, said method further comprises the step of supplying at least one fixed voltage to said frequency modulator, to generate as said test signal a signal having a frequency corresponding to said fixed voltage.

16. The method of claim 1, wherein the step of processing said input signal comprises the steps of:

equalizing said input signal, responsive to said reproduced level of said test signal.

17. The method of claim 16, wherein the step of processing said input signal further comprises the steps of:
   preemphasizing said input signal to generate a preemphasized signal; and
   frequency-modulating a carrier signal by said preemphasized signal to generate a frequency-modulated signal; and
   wherein said step of equalizing said input signal is performed on the frequency-modulated signal.

18. The method of claim 1, wherein the step of processing said input signal comprises the step of enhancing detail in said input signal, responsive to the results of said assessment of the characteristics.

19. A magnetic recording and reproducing apparatus for recording and reproducing a signal on a magnetic medium, comprising:
   a test signal generator for generating a test signal comprising at least one test frequency;
   a record circuit for producing a record signal by processing an input signal responsive to a control signal, or on the basis of said test signal;
   a record/playback mechanism coupled to said record circuit, for recording said record signal on said magnetic medium, and for picking up a signal recorded on said magnetic medium, thereby generating a playback signal;
   a playback circuit coupled to said record/playback mechanism, for processing said playback signal, thereby producing an output signal;
   a test signal level detector coupled to said playback circuit, for measuring a reproduced level of said test frequency, thereby assessing characteristics of said magnetic medium;
   a record controller coupled to said record circuit and said test signal level detector, for determining optimal control conditions from the reproduced level of said test frequency and producing said control signal according to said optimal control conditions;
   said record circuit optimizing said record signal according to said characteristics of said magnetic medium on the basis of said control signal;
   signal detecting means for determining whether a previously-recorded signal is present on said magnetic medium;
   a system controller for causing, if no previously-recorded signal is present, said test signal generator, said record circuit and said record/playback mechanism to record said test signal, said record/playback mechanism and said playback circuit to reproduce said test signal, said test signal level detector to measure said the reproduced level of said test frequency, and said record controller to determine said optimum control conditions therefrom.

20. The apparatus of claim 19, wherein, if said system controller determines that a previously-recorded signal is present, it causes said record/playback mechanism to move said magnetic medium to a point where no previously-recorded signal is present.

21. The apparatus of claim 19, wherein said system controller causes the assessment of the characteristics to be conducted when said magnetic medium is inserted in said record/playback mechanism.

22. The apparatus of claim 19, wherein said system controller causes the assessment of the characteristics to be conducted prior to recording of said input signal when is commanded to record the input signal.

23. The apparatus of claim 19, wherein said magnetic medium is a magnetic tape.

24. The apparatus of claim 23, wherein said magnetic medium is a video cassette tape.

25. The apparatus of claim 19, wherein said record/playback mechanism has a control head that records and reproduces control pulses on said magnetic medium, and said system controller determines whether a previously-recorded signal is present by detecting said control pulses.

26. The apparatus of claim 19, wherein said playback signal comprises an audio signal, said playback circuit detects an envelope of said audio signal, and said system controller determines from said envelope whether a previously-recorded signal is present.

27. The apparatus of claim 19, wherein said playback signal comprises a frequency-modulated video signal, said playback circuit detects an envelope of said frequency-modulated video signal, and said system controller determines from said envelope whether a previously-recorded signal is present.

28. The apparatus of claim 19, wherein said playback signal comprises a video signal with synchronization pulses, said playback circuit separates said synchronization pulses from said video signal, and said system controller determines from said synchronization pulses whether a previously-recorded signal is present.

29. The apparatus of claim 19, wherein said test signal has at least two test frequencies.

30. The apparatus of claim 29, wherein said test signal generator comprises:
   an oscillator for generating a first signal having a first frequency;
   a frequency doubler for doubling said first frequency, thereby producing a second signal; and
   a multiplexer for combining said first signal and said second signal to produce said test signal.

31. The apparatus of claim 30, wherein said oscillator is a system controller clock oscillator.

32. The apparatus of claim 30, wherein said oscillator is a color subcarrier oscillator.

33. The apparatus of claim 29, wherein said test signal generator comprises:
   an oscillator for generating a first signal having a first frequency;
   a frequency divider for dividing said first frequency in half, thereby producing a second signal; and
   a multiplexer for combining said first signal and said second signal to produce said test signal.

34. The apparatus of claim 33, wherein said oscillator is a system controller clock oscillator.

35. The apparatus of clam 33, wherein said oscillator is a color subcarrier oscillator.

36. The apparatus of claim 19, wherein said record circuit comprises a frequency modulator, and said test signal generator comprises a voltage source for producing at least one fixed voltage, said frequency modulator receiving said fixed voltage in substitution for said input signal.

37. The apparatus of claim 19, wherein said record circuit comprises an equalizer controlled by said control signal from said record controller.

38. The apparatus of claim 19, wherein said record circuit comprises a detail-enhancement circuit controlled by said control signal from said record controller.

* * * * *